(12) United States Patent
Shiina et al.

(10) Patent No.: US 11,929,781 B2
(45) Date of Patent: Mar. 12, 2024

(54) TERMINAL DEVICES, COMMUNICATION METHODS, AND COMMUNICATION SYSTEMS

(71) Applicant: NIPPON TELEGRAPH AND TELEPHONE CORPORATION, Tokyo (JP)

(72) Inventors: Ryota Shiina, Musashino (JP); Tomohiro Taniguchi, Musashino (JP); Kazutaka Hara, Musashino (JP); Shinya Tamaki, Musashino (JP); Tomoki Murakami, Musashino (JP); Toshiro Nakahira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 51 days.

(21) Appl. No.: 17/790,990

(22) PCT Filed: Jan. 23, 2020

(86) PCT No.: PCT/JP2020/002409
§ 371 (c)(1),
(2) Date: Jul. 6, 2022

(87) PCT Pub. No.: WO2021/149229
PCT Pub. Date: Jul. 29, 2021

(65) Prior Publication Data
US 2023/0033853 A1    Feb. 2, 2023

(51) Int. Cl.
*H04B 10/11* (2013.01)
*H04B 10/80* (2013.01)

(52) U.S. Cl.
CPC ............. *H04B 10/11* (2013.01); *H04B 10/80* (2013.01)

(58) Field of Classification Search
CPC .... H04B 10/11; H04B 10/80; H04B 10/1141; H04B 10/85

(Continued)

(56) References Cited

U.S. PATENT DOCUMENTS

| 10,594,680 B2 * | 3/2020 | Sethi | H04B 10/1149 |
| 2010/0272081 A1 * | 10/2010 | Laroia | H04W 72/23 370/338 |

(Continued)

FOREIGN PATENT DOCUMENTS

| JP | H11502096 A | * | 2/1999 | ......... H04B 10/1149 |
| JP | 2016504794 A | * | 2/2016 | ......... H04B 10/1149 |

(Continued)

*Primary Examiner* — Abbas H Alagheband
(74) *Attorney, Agent, or Firm* — Harness, Dickey & Pierce, P.L.C.

(57) ABSTRACT

An objective is to provide a terminal device, a communication method, and a communication system in which the time taken by connection operations/authentication operations does not increase proportionally with the pattern length, even if the transmitting side and the receiving side are not synchronized. A terminal device, a communication method, and a communication system according to the present invention create n pieces of signal information (n-bit patterns) by sequentially shifting each bit of a single piece of received signal information (n-bit pattern) one bit at a time. Through the above, signal information time-shifted by one bit each is obtained. Thus, even if the transmitting side and the receiving side are not synchronized, one of the n pieces of signal information is a signal synchronized with the transmitting side. Thereafter, the signal synchronized with the transmitting side can be detected by a brute-force calculation with the patterns (ID information) in the list.

6 Claims, 17 Drawing Sheets

(58) Field of Classification Search
USPC .......................................................... 398/118
See application file for complete search history.

(56) References Cited

U.S. PATENT DOCUMENTS

| | | | |
|---|---|---|---|
| 2010/0307251 A1* | 12/2010 | Welle | G01S 7/4866 |
| | | | 367/87 |
| 2011/0119745 A1* | 5/2011 | Bremner | H04W 12/04 |
| | | | 726/7 |
| 2014/0029512 A1* | 1/2014 | Chu | H04L 63/08 |
| | | | 370/328 |
| 2017/0195339 A1* | 7/2017 | Brown | H04W 4/80 |
| 2018/0139202 A1* | 5/2018 | Sethi | H04W 84/12 |

FOREIGN PATENT DOCUMENTS

| | | | | | |
|---|---|---|---|---|---|
| JP | 2017510153 A | * | 4/2017 | ........... | H04L 12/437 |
| JP | 2018139427 A | * | 9/2018 | ......... | G07C 9/00309 |
| WO | WO-2011080867 A1 | * | 7/2011 | ......... | H04B 10/1149 |

* cited by examiner

Fig. 14

| NO. | OPTICAL ID | CONNECTION OPERATIONS/AUTHENTICATION INFORMATION FOR RF COMMUNICATION | | | | | |
|---|---|---|---|---|---|---|---|
| | | SCHEME | FREQUENCY | CHANNEL | SSID | PASSWORD | ... | PRIORITY |
| 1 | 00010110 | 802.11n | 2.4GHz | ... | ... | ... | ... | 2 |
| 2 | 10101010 | 802.11ac | 5GHz | ... | ... | ... | ... | 1 |
| ... | | | | | | | | |
| n | 11101011 | 802.11ac | 5GHz | ... | ... | ... | ... | 3 |

TERMINAL DEVICES, COMMUNICATION METHODS, AND COMMUNICATION SYSTEMS

CROSS-REFERENCE TO RELATED APPLICATIONS

This application is a 371 U.S. National Phase of International Application No. PCT/JP2020/002409, filed on Jan. 23, 2020. The entire disclosure of the above application is incorporated herein by reference.

TECHNICAL FIELD

The present disclosure relates to hybrid optical/RF wireless communication between a base station and a terminal device.

BACKGROUND ART

In this specification, the direction going from the base station to the terminal device is designated "downlink", and the direction going from the terminal device to the base station is designated "uplink".

In wireless communication systems such as Wi-Fi, hybrid optical/RF wireless communication in which optical wireless communication (downlink communication using LED illumination or the like) is used to notify the terminal device of connection operation/authentication data such as an SSID and a password (PW) necessary for establishing a connection between the base station and the terminal device is known (see Patent Literature 1, for example). Hybrid optical/RF wireless communication has the merit of enabling the user of the terminal device to connect to Wi-Fi simply by entering an optical wireless communication area, without having to ascertain the SSID and PW and perform an input operation or the like.

CITATION LIST

Patent Literature

Patent Literature 1: U.S. Unexamined Patent Application Publication No. 20180139202

SUMMARY OF THE INVENTION

Technical Problem

In hybrid optical/RF wireless communication, the connection operation/authentication information itself for RF communication is not transmitted by optical wireless communication, but rather a corresponding optical ID of small data size is transmitted. An optical transmitter at the base station transmits the above optical ID through changes in color/brightness under conditions that are imperceptible to humans. A correspondence list between the optical ID and the connection operation/authentication information is stored in both the base station and the terminal device, and the terminal device extracts the connection operation/authentication information corresponding to the received optical ID from the correspondence list to perform RF communication according to the information.

Because an optical signal is used to perform the connection operation/authentication control of RF communication, the merits of such hybrid optical/RF wireless communication include the ability to use a light source for both optical wireless communication and illumination on the base station side, and additionally, the ability to use a standard terminal device such as a smartphone on the terminal device side. Furthermore, there are merits of being able to reduce equipment installation costs and power consumption.

In the case of using an optical ID to perform the connection operation/authentication work, an illuminance sensor or the like installed in a terminal device such as a smartphone is used to read changes in the illuminance or color of light and perform a binary conversion on the basis of a certain threshold to receive information about the optical ID.

Proposed methods of using an optical ID to perform the connection operation/authentication work include a correlation method that reduces the error rate of the information by calculating a correlation coefficient between the illuminance of the received optical signal and patterns described in a list, and a threshold determination method that converts the received optical signal into a binary value on the basis of a certain threshold and obtains the information by a matching process against patterns described in a list.

Here, in the case of optical wireless communication, because data is transmitted and received in a range (up to approximately 10 Hz) detectable with an illuminance sensor such as a camera or illuminance sensor installed in a terminal such as a smartphone, the transmission rate is extremely slow, ranging from a few bps to a few dozen bps. Consequently, the processing time for pattern matching as described above increases in proportion to the pattern length, and the connection operations/authentication operations are time-consuming.

In the case of wireless LAN or Ethernet® communication, to reduce the error rate during frame transmission, the transmitting side prepends a preamble, which is a synchronization code for each transmitted frame, such that the receiving side and the transmitting side of the frame are synchronized to a clock frequency. However, if synchronization of the transmitting side and the receiving side is attempted in optical wireless communication, the connection operations/authentication operations for the preamble alone are time-consuming because of the slow communication speed as described above. For this reason, in typical optical wireless communication, the transmitting side and the receiving side are not synchronized in many cases.

On the other hand, in the case of not synchronizing the transmitting side and the receiving side, the preamble is unnecessary, but synchronization error causes discrepancies between the information acquired by the method described above and the listed pattern, and in many causes the pattern matching work has to be repeated until a match between the listed pattern and the information is found. Furthermore, because the communication is slow as described above, a longer pattern length leads to a longer period of the pattern matching work, and the connection operations/authentication operations become even more time-consuming. If the connection operations/authentication operations are time-consuming, the user wait time increases during application authentication and load balancing.

In this way, because the pattern matching work is repeated in optical wireless communication in which the transmitting side and the receiving side are not synchronized, there is a problem in that the connection operations/authentication operations take longer time in proportion to the pattern length.

The above problem is summarized as follows.

In the case of optical wireless communication using a dedicated receiver and transmitter, such as Light Fidelity (Li-Fi), high-speed communication is possible. However, in the case of hybrid optical/RF wireless communication rather than Li-Fi, it is necessary to use equipment not originally used for communication purposes (for example, Internet of Things (IoT) lighting on the transmitting side and an illuminance sensor on the receiving side) for the connection operations/authentication operations. In such cases, because high-speed communication like Li-Fi is unavailable, difficulties like the following occur.

(1) It is difficult to set a preamble in the signal.
(2) Errors easily occur because the transmitting side and the receiving side are not synchronized.
(3) Because of the low speed, the connection operations/authentication operations are time-consuming in proportion to the pattern length.
(4) The wait time increases proportionally with the pattern length.

The problem is to address difficulties like the above.

Accordingly, to address the above problem, an objective of the present invention is to provide a terminal device, a communication method, and a communication system capable of minimizing error and also achieving connection operations/authentication operations quickly, even if the transmitting side and the receiving side are not synchronized.

Means for Solving the Problem

To achieve the above objective, a terminal device according to the present invention creates a plurality of signal information (patterns) by sequentially shifting each bit of a single piece of received signal information (pattern) one bit at a time, and performs a brute-force comparison between the plurality of signal information and patterns described in a list.

Specifically, a terminal device according to the present invention communicates with a base station by optical wireless communication and radio frequency (RF) wireless communication, and includes:
an illuminance sensor that receives an optical signal for the optical wireless communication from the base station;
an information acquisition unit that retrieves signal information containing n bits (where n is an integer equal to or greater than 2) included in the optical signal;
an array generation unit that generates n pieces of signal information by sequentially shifting each bit of the signal information one bit at a time;
a list in which ID information and authentication information for initiating the RF wireless communication are associated; and
an analysis unit that performs a brute-force calculation of a correlation coefficient between the n pieces of signal information generated by the array generation unit and the ID information in the list, and selects the ID information with the maximum correlation coefficient.

Furthermore, a communication method according to the present invention is a communication method between a terminal device and a base station by optical wireless communication and radio frequency (RF) wireless communication, the method including:
by the terminal device,
receiving an optical signal for the optical wireless communication from the base station;
retrieving signal information containing n bits (where n is an integer equal to or greater than 2) included in the optical signal;
generating n pieces of signal information by sequentially shifting each bit of the signal information one bit at a time;
using a list in which ID information and authentication information for initiating the RF wireless communication are associated to perform a brute-force calculation of a correlation coefficient between the n pieces of signal information and the ID information in the list; and
selecting the ID information with the maximum correlation coefficient.

Furthermore, a communication system according to the present invention is a communication system in which a terminal device communicates with a base station by optical wireless communication and radio frequency (RF) wireless communication, wherein
the terminal device includes
an illuminance sensor that receives an optical signal for the optical wireless communication from the base station;
an information acquisition unit that retrieves signal information containing n bits (where n is an integer equal to or greater than 2) included in the optical signal;
an array generation unit that generates n pieces of signal information by sequentially shifting each bit of the signal information one bit at a time;
a list in which ID information and authentication information for initiating the RF wireless communication are associated; and
an analysis unit that performs a brute-force calculation of a correlation coefficient between the n pieces of signal information generated by the array generation unit and the ID information in the list, and selects the ID information with the maximum correlation coefficient.

The terminal device, the communication method, and the communication system according to the present invention create n pieces of signal information (n-bit patterns) by sequentially shifting each bit of a single piece of received signal information (n-bit pattern) one bit at a time. Through the above, signal information time-shifted by one bit each is obtained. Thus, even if the transmitting side and the receiving side are not synchronized, one of the n pieces of signal information is a signal synchronized with the transmitting side. Thereafter, the signal synchronized with the transmitting side can be detected by the brute-force calculation with the patterns (ID information) in the list. In other words, with this method, it is no longer necessary to repeat the pattern matching work, and therefore the duration of the connection operations/authentication operations is not influenced by the pattern length as easily.

Consequently, it is possible to provide a terminal device, a communication method, and a communication system capable of minimizing error and also achieving connection operations/authentication operations quickly, even if the transmitting side and the receiving side are not synchronized.

Also, the terminal device according to the present invention further includes an RF transmission and reception unit that acquires the authentication information corresponding to the ID information selected by the analysis unit, and transmits the authentication information to the base station by the RF wireless communication.

Note that in the case of analog optical wireless communication, the information acquisition unit samples the illuminance of the optical signal with sampling points of the same or finer granularity than the bit pattern of the optical signal, and treats the sampled values as the signal information.

On the other hand, in the case of digital optical wireless communication, the information acquisition unit includes a determination unit that acquires sampled values by sampling the illuminance of the optical signal with sampling points of finer granularity than the bit pattern of the optical signal, and compares the sampled values to an arbitrary threshold to convert the optical signal into binary values; and an estimation unit that has a determination time shorter than the duration of a single bit in the bit pattern and longer than a duration corresponding to sampling point intervals included in a single bit of the bit pattern, and estimates the signal information by treating the value appearing more often in the binary values included in the determination time as the value of the bit.

Note that the above inventions can be combined where possible.

Effects of the Invention

A terminal device, a communication method, and a communication system capable of minimizing error and also achieving connection operations/authentication operations quickly, even if the transmitting side and the receiving side are not synchronized, can be provided.

BRIEF DESCRIPTION OF DRAWINGS

FIG. 14 is a diagram for explaining a correspondence list of the terminal device according to the present invention.

DESCRIPTION OF EMBODIMENTS

An embodiment of the present invention will be described with reference to the attached drawings. The embodiment described hereinafter is an example of the present invention, but the present invention is not limited to the following embodiment. Note that in the specification and the drawings, structural elements denoted with the same signs are assumed to be identical to each other.

Figure 1:
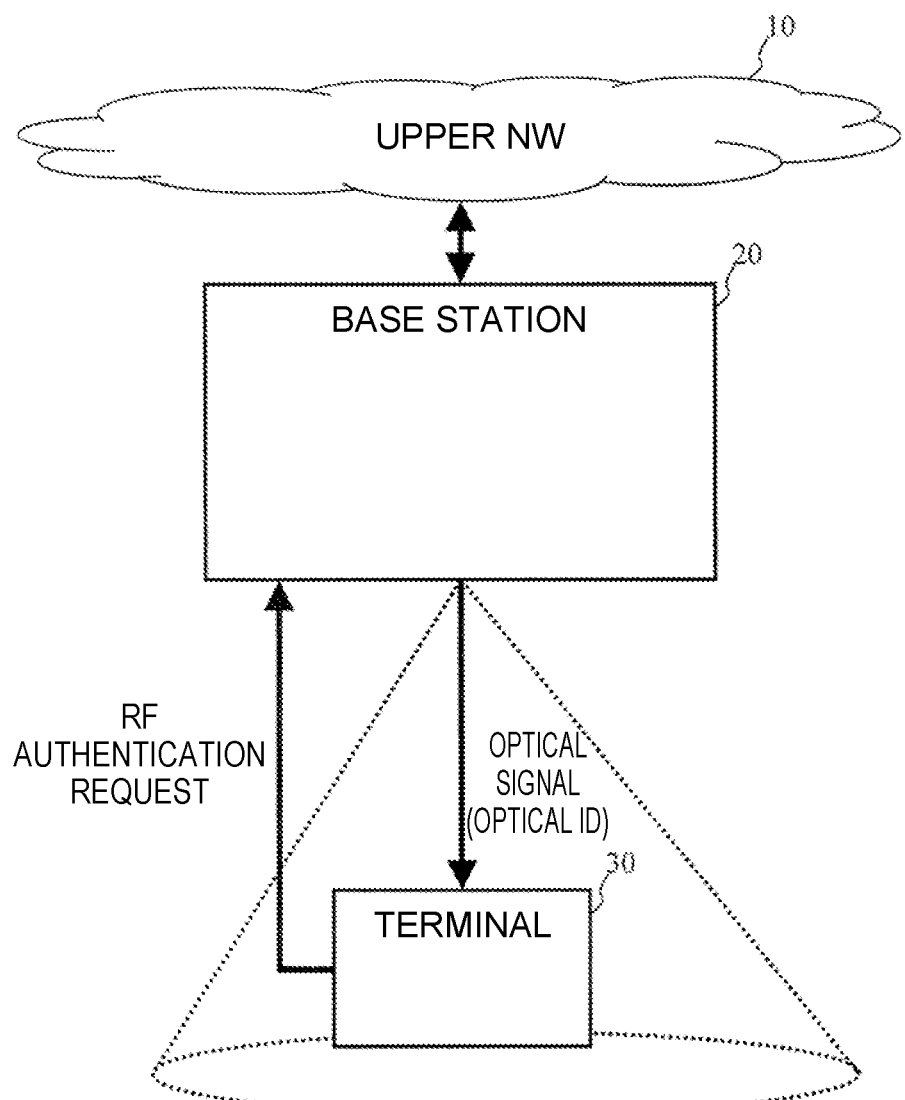
FIG. 1 is a diagram for explaining a communication system according to the present invention.

FIG. 1 is a diagram for explaining a communication system 301 according to the present embodiment. The communication system 301 is a communication system in which a base station 20 and a terminal device 30 communication by optical wireless communication and RF wireless communication.

The base station 20 transmits an optical ID corresponding to connection operation/authentication information for RF transmission and reception to the terminal device 30 existing in a predetermined area 40.

The terminal device 30 uses the connection operation/ authentication information for RF transmission and reception corresponding to the received optical ID to transmit an appropriate authentication request to the base station 20.

Note that in the following description, the "connection operation/authentication information" may be referred to as "RF authentication information" or "ID information".

Figure 2:
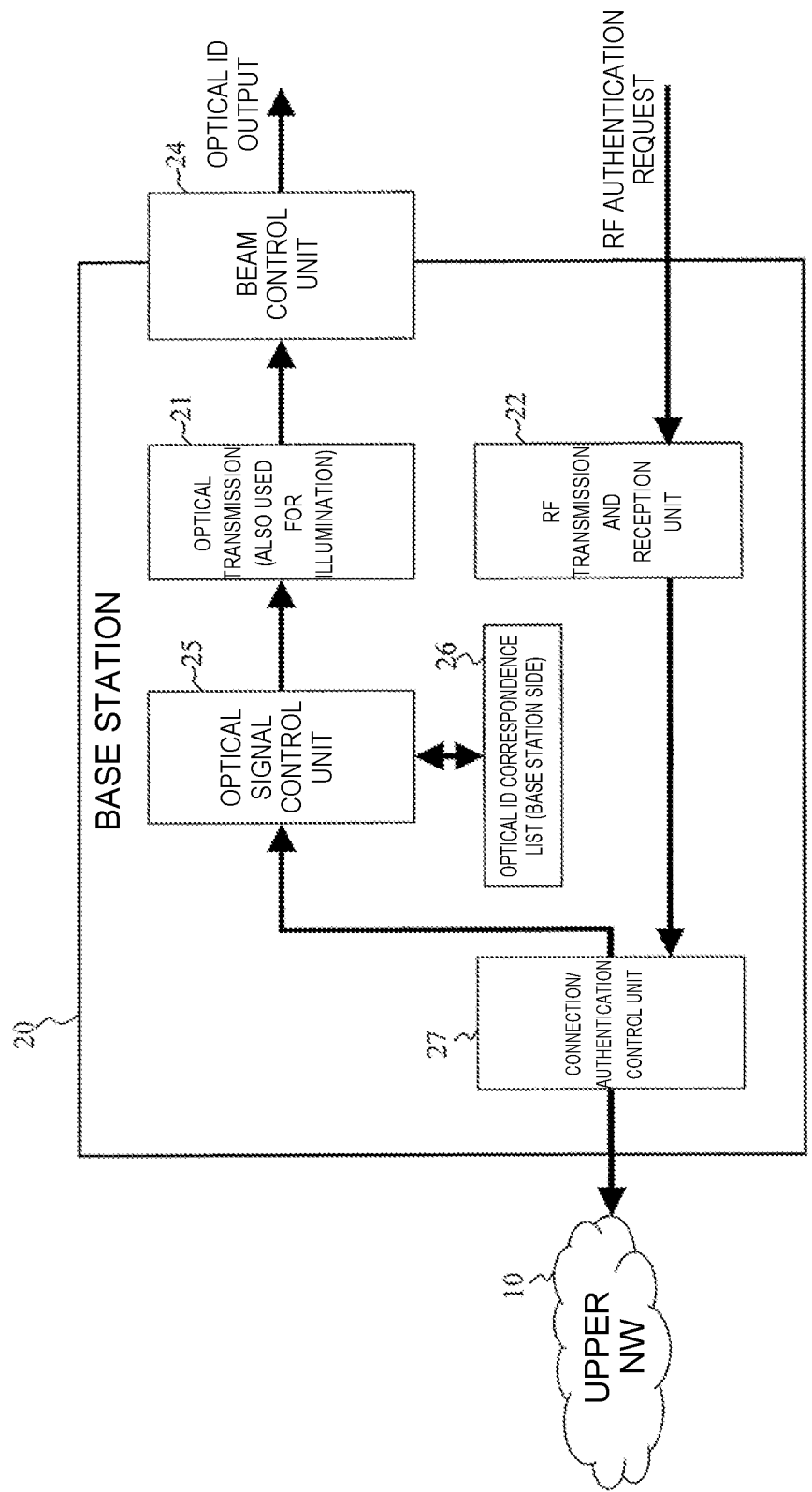
FIG. 2 is a diagram for explaining a configuration of a base station of the communication system according to the present invention.

FIG. 2 is a diagram for explaining the configuration of the base station 20. The base station 20 is provided with an optical transmitter 21, an RF transmission and reception unit 22, a beam control unit 24, an optical signal control unit 25, an optical ID correspondence list 26, and a connection/ authentication control unit 27.

The connection/authentication control unit 27 manages connection operation/authentication information for using RF communication. Note that connection operations mean which wireless scheme/IF to allow/prioritize for connection. Authentication information means information such as a service set identifier (SSID), an identification number (ID), and a password.

Also, the connection/authentication control unit 27 receives an RF authentication request from the terminal device 30, and allows the terminal device 30 to communicate with an upper NW 10 if the authentication information in the request is confirmed to agree with authentication information held in the connection/authentication control unit 27 itself.

The optical signal control unit 25 checks connection operation/authentication information reported from the connection/authentication control unit 27 against the optical ID correspondence list 26, and extracts a corresponding optical ID. Thereafter, the optical signal control unit 25 modulates a signal pattern of the extracted optical ID. Here, modulation is performed under modulation conditions such that the output light from the optical transmission unit 21 is imperceptible to humans. Note that the optical ID correspondence list 26 is a list in which connection operation/authentication information for RF transmission and reception is associated with an optical ID (see FIG. 14).

The optical transmitter 21 uses a light source such as an LED with a dimming or color-changing function. The light source may also be used for illumination purposes. The optical transmitter 21 converts the optical ID (modulated signal) from the optical signal control unit 25 into an optical signal having a predetermined wavelength, power, modulation scheme, or data rate. The present embodiment describes a case in which the optical transmitter 21 transmits an optical signal (an optical signal modulated by the optical ID according to the above conditions) such that a certain illuminance or higher is obtained inside the predetermined area 40.

The beam control unit 24 transmits the optical signal into space while controlling the beam shape such that the optical signal from the optical transmitter 21 can reach the predetermined area 40. If an obstacle blocking the light does not exist, the optical signal reaches all terminal devices 30 in the predetermined area 40. Note that the base station is assumed to transmit the same optical ID repeatedly.

The RF transmission and reception unit 22 transmits and receives RF signals according to a predetermined protocol (such as Wi-Fi or LTE). The RF transmission and reception unit 22 may also support multiple wireless standards (such as Wi-Fi 2.4 GHz/5 GHz).

Figure 3:
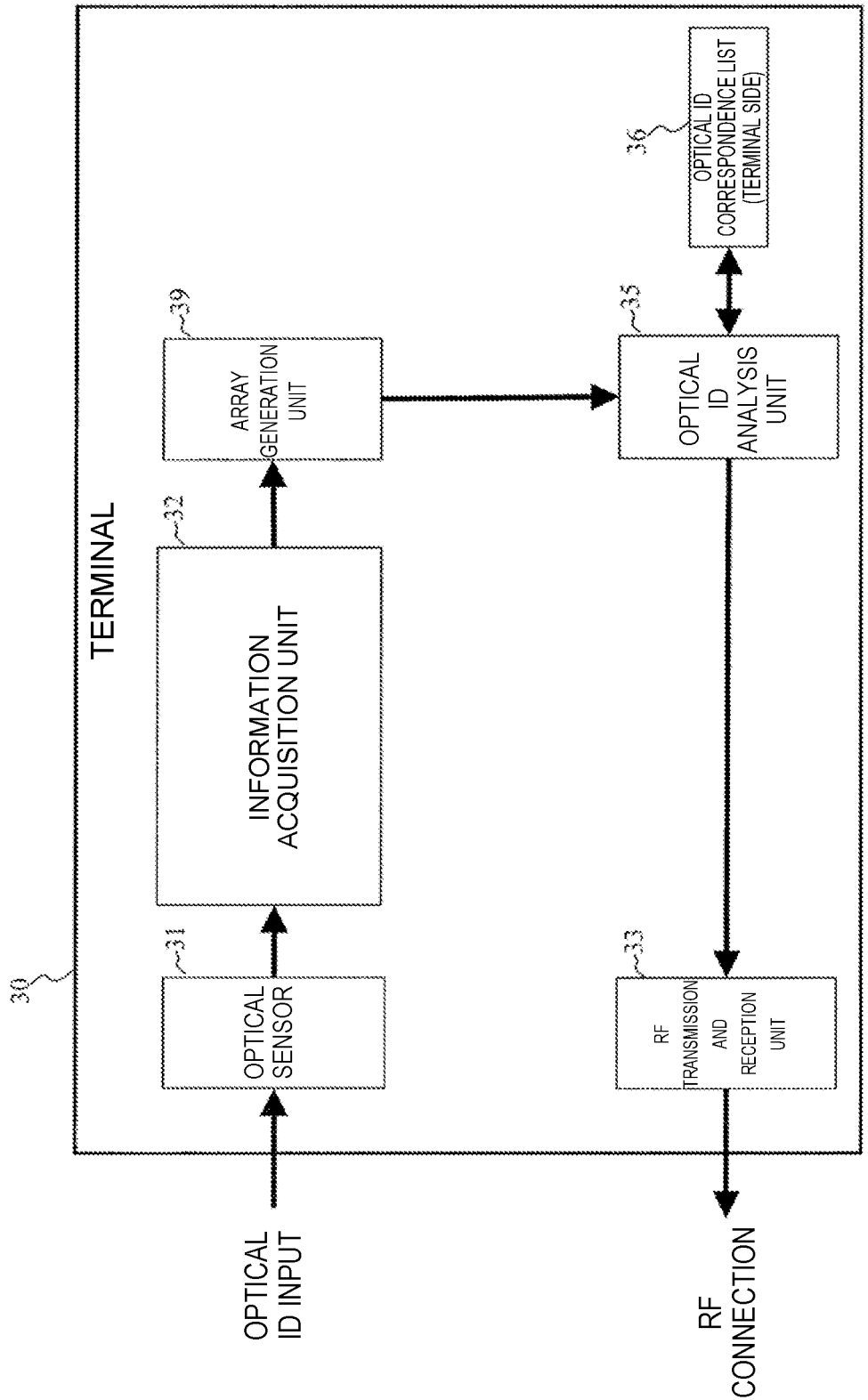
FIG. 3 is a diagram for explaining a configuration of a terminal device of the communication system according to the present invention.

FIG. 3 is a diagram for explaining the configuration of the terminal device 30. The terminal device is provided with an illuminance sensor 31 that receives an optical signal for the optical wireless communication from the base station 20;

an information acquisition unit 32 that retrieves signal information containing n bits (where n is an integer equal to or greater than 2) included in the optical signal;

an array generation unit 39 that generates n pieces of signal information by sequentially shifting each bit of the signal information one bit at a time;

a list (optical ID correspondence list 36) in which ID information and authentication information for initiating the RF wireless communication are associated; and an analysis unit (optical ID analysis unit 35) that performs a brute-force calculation of a correlation coefficient between the n pieces of the signal information generated by the array generation unit 39 and the information in the list 36, and selects the ID information with the maximum correlation coefficient.

Additionally, the terminal device 30 is further provided with:

an RF transmission and reception unit 33 that acquires from the list 36 the authentication information corresponding to the ID information selected by the optical ID analysis unit 35, and transmits the authentication information to the base station 20 by the RF wireless communication.

The illuminance sensor 31 converts the optical signal from the optical transmitter 21 into an electrical reception signal, and acquires the signal as a light illuminance value. The illuminance sensor 31 is not limited to being a dedicated optical receiver for optical wireless communication, and in the case where the terminal device 30 is a smartphone, an illuminance sensor or camera function provided in the smartphone itself or some other function capable of measuring light intensity may be used as the illuminance sensor 31.

Note that a dedicated optical receiver for optical wireless communication refers to wireless communication equipment, such as communication equipment that achieves a wireless connection between a personal computer (PC) and a network such as the Internet without using radio waves by connecting to the PC in a wired fashion, for example.

(Form 1 of Information Acquisition Unit)

The present form is for the case of analog optical wireless communication. The information acquisition unit 32 samples the illuminance of the optical signal with sampling points of the same or finer granularity than the bit pattern of the optical signal, and treats the sampled values as the signal information.

Figure 4:
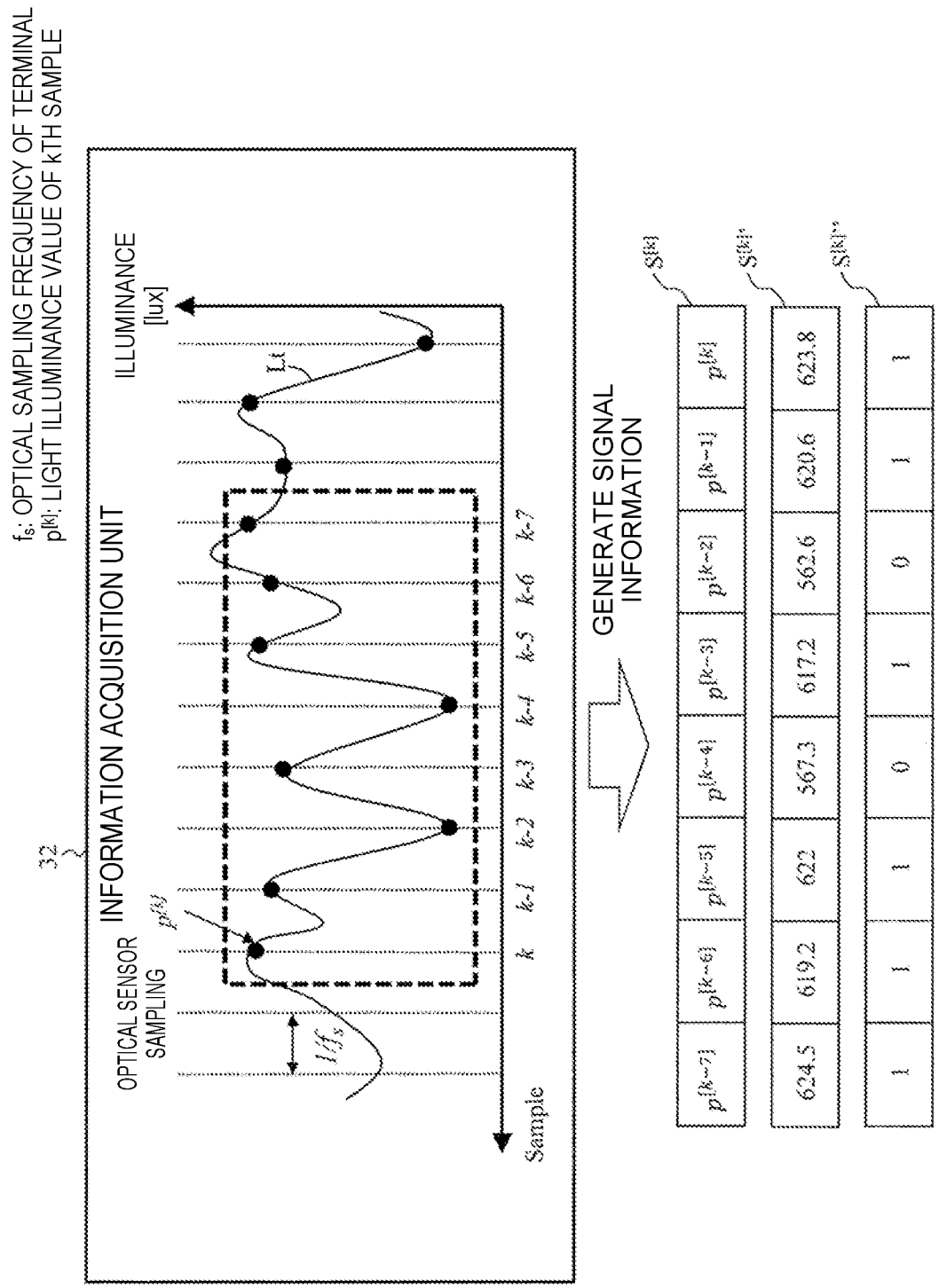
FIG. 4 is a diagram for explaining how a terminal device information acquisition unit generates signal information according to the present invention.

FIG. 4 is a diagram for explaining how the information acquisition unit 32 generates signal information according to the present form. An illuminance value Lt of an optical signal that varies with time is inputted into the information acquisition unit 32 from the illuminance sensor 31. The information acquisition unit 32 samples the illuminance value Lt at a sampling frequency $f_s$, and acquires a sampled illuminance value $p^{[k]}$ (where k is the sampling point). Here, the sampling frequency $f_s$ is of the same or finer granularity than the bit pattern (optical ID) of the optical signal transmitted by the base station 20. Note that "granularity" means the length (duration) of each bit included in the optical ID. In the example in FIG. 4, the granularity is an interval at which each bit included in the optical ID can be sampled once.

At this time, the information acquisition unit 32 generates signal information $S^{[k]}$ in which a number of sampled illuminance values equal to the number of bits included in the optical ID are arranged in time-series (sampling) order. In the case of FIG. 4, the optical ID contains 8 bits, and therefore the information acquisition unit 32 generates signal information $S^{[k]}$ containing eight sampled illuminance values ($p^{[k]}$, $p^{[k-1]}$, $p^{[k-2]}$, $p^{[k-3]}$, $p^{[k-4]}$, $p^{[k-5]}$, $p^{[k-6]}$, $p^{[k-7]}$). Also, $S^{[k]}$ ' is a specific example of sampled illuminance values. The information acquisition unit 32 makes a 0/1 determination on the sampled values according to a certain threshold to obtain the signal information $S^{[k]}$. In this example, the 0/1 determination is made by treating 600 lux as the threshold to generate $S^{[k]}$ ", which is treated as the signal information $S^{[k]}$.

Note that in the case where the transmission sampling frequency and the reception sampling frequency are the same as in FIG. 4, it is possible to calculate a correlation coefficient with the ID information described later without digitizing through the 0/1 determination.

(Form 2 of Information Acquisition Unit)

Figure 5:
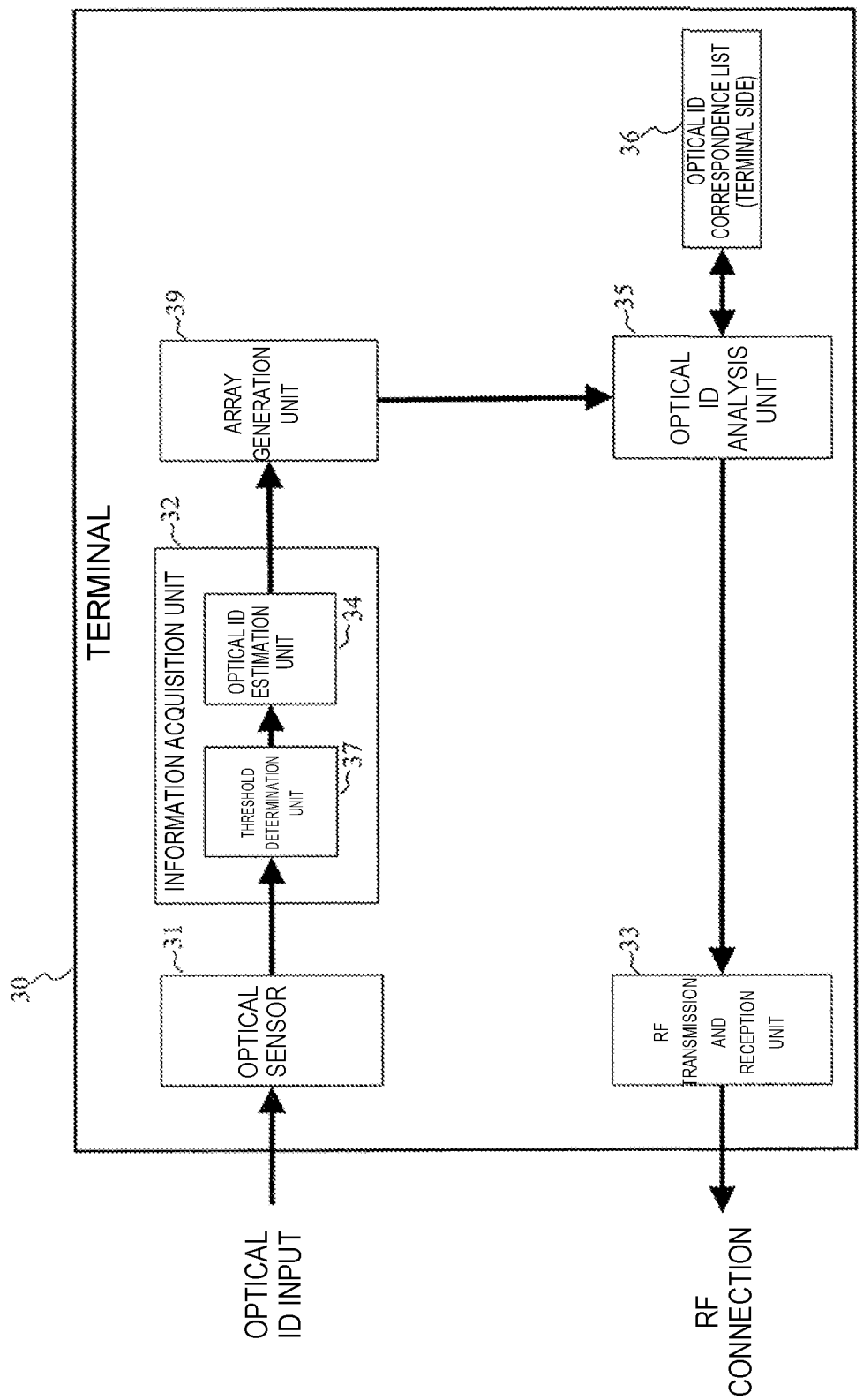
FIG. 5 is a diagram for explaining a configuration of a terminal device of the communication system according to the present invention.

The present form is for the case of digital optical wireless communication. FIG. 5 is a diagram for explaining the configuration of the terminal device 30 according to the present form. The information acquisition unit 32 of the terminal device 30 according to the present form includes:

a determination unit (threshold determination unit 37) that acquires sampled values by sampling the illuminance of the optical signal with sampling points of finer granularity than the bit pattern of the optical signal, and compares the sampled values to an arbitrary threshold to convert the optical signal into binary values; and an estimation unit (optical ID estimation unit 34) that has a determination time shorter than the duration of a single bit in the bit pattern and longer than a duration corresponding to sampling point intervals included in a single bit of the bit pattern, and estimates the signal information by treating the value appearing more often in the binary values included in the determination time as the value of the bit.

Figure 6:
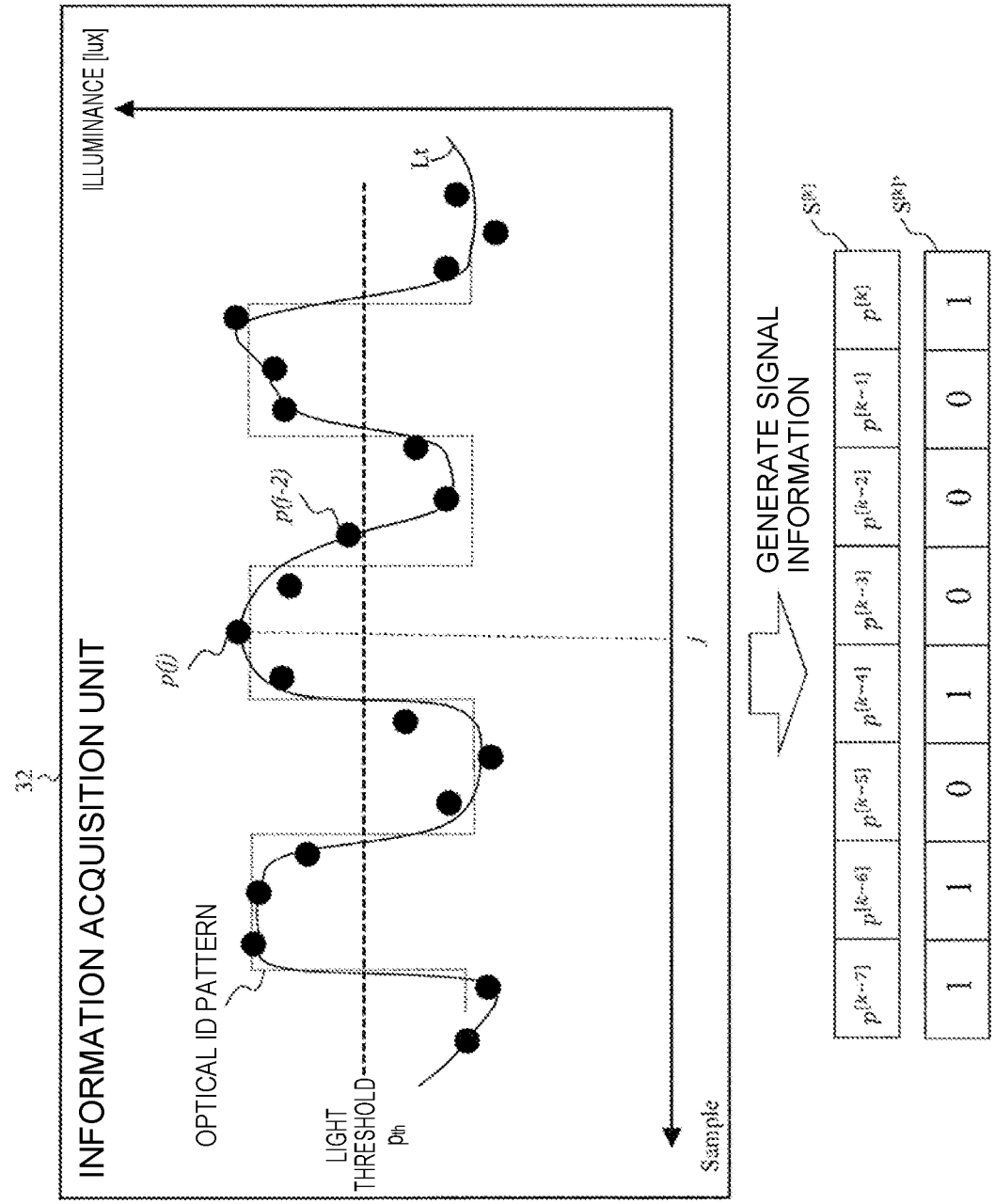
FIG. 6 is a diagram for explaining the illuminance of an optical signal received by the terminal device according to the present invention.
Figure 7:
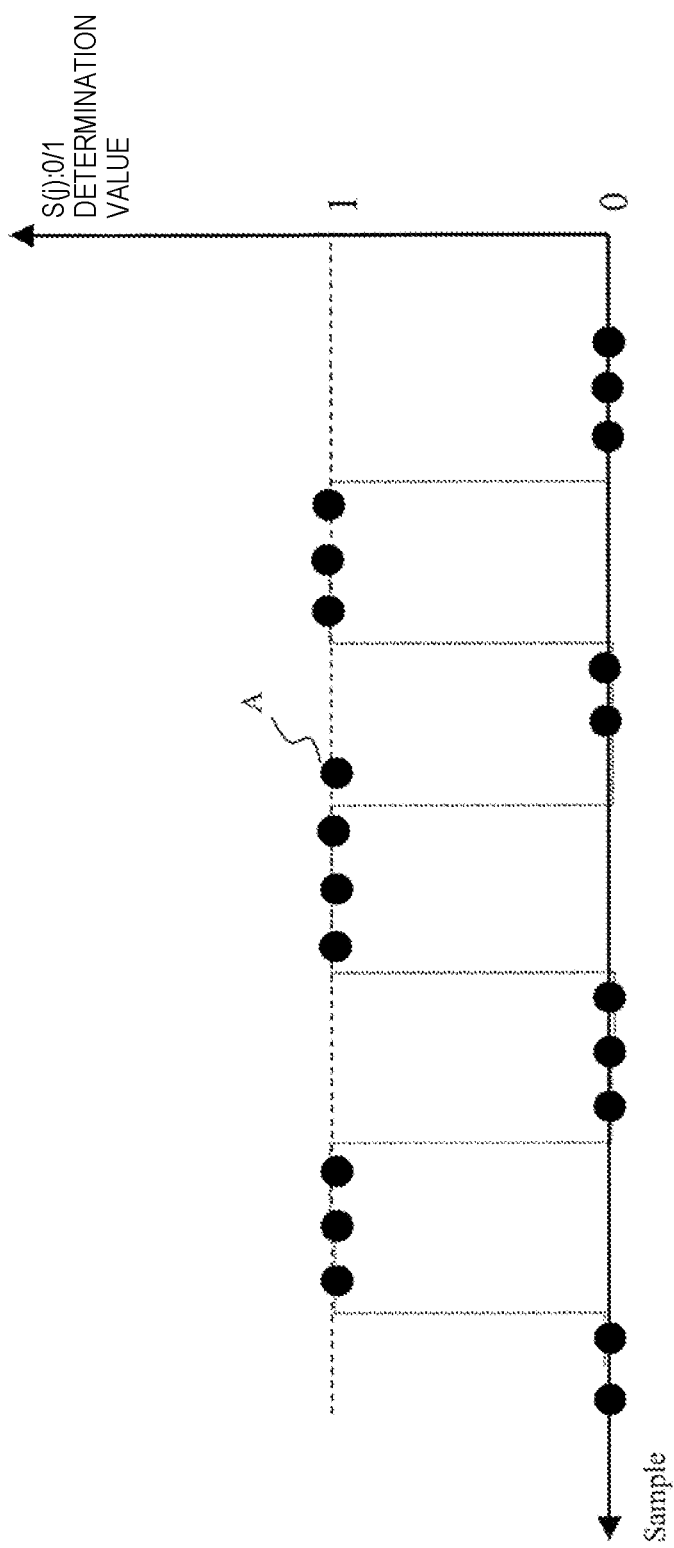
FIG. 7 is a diagram for explaining a process performed by a threshold determination unit of the terminal device according to the present invention.

The threshold determination unit 37 uses a preset threshold $p_{th}$ to binarize (1/0) the optical signal received by the information acquisition unit 32. FIG. 6 and FIG. 7 are diagrams for explaining a process performed by the threshold determination unit 37. First, an illuminance value Lt of the optical signal is inputted into the threshold determination unit 37 from the illuminance sensor 31. As in FIG. 6, the threshold determination unit 37 samples the illuminance value Lt at a finer granularity than the pattern of the optical ID. Here, a "finer granularity than the pattern of the optical ID" means a shorter interval than the length (duration) of each bit included in the optical ID. In the example in FIG. 6, the granularity is an interval at which each bit included in the optical ID can be sampled three times. In FIG. 6, p(j) is the sampled value, where j is the sample number. Due to various factors, a sampled value may be higher or lower than the true value (optical ID pattern). At this point, the description will focus on the sampled value p(j−2).

The sampled illuminance p(j) is binarized by determining that S(j)=1 in the case where $p(j) \geq p_{th}$ and determining that S(j)=0 in the case where $p(j) < p_{th}$. Here, S(j) is the determination value of 1 or 0 determined by the threshold determination unit 37 for the illuminance p(j) of the sampling number j. FIG. 7 illustrates a binarization of the sampled values in FIG. 6 according to the threshold $p_t$h. Here, the sampled value p(j−2) should be "0" originally, but is incorrectly determined as "1" because of the large influence due to noise (point A).

Figure 8:
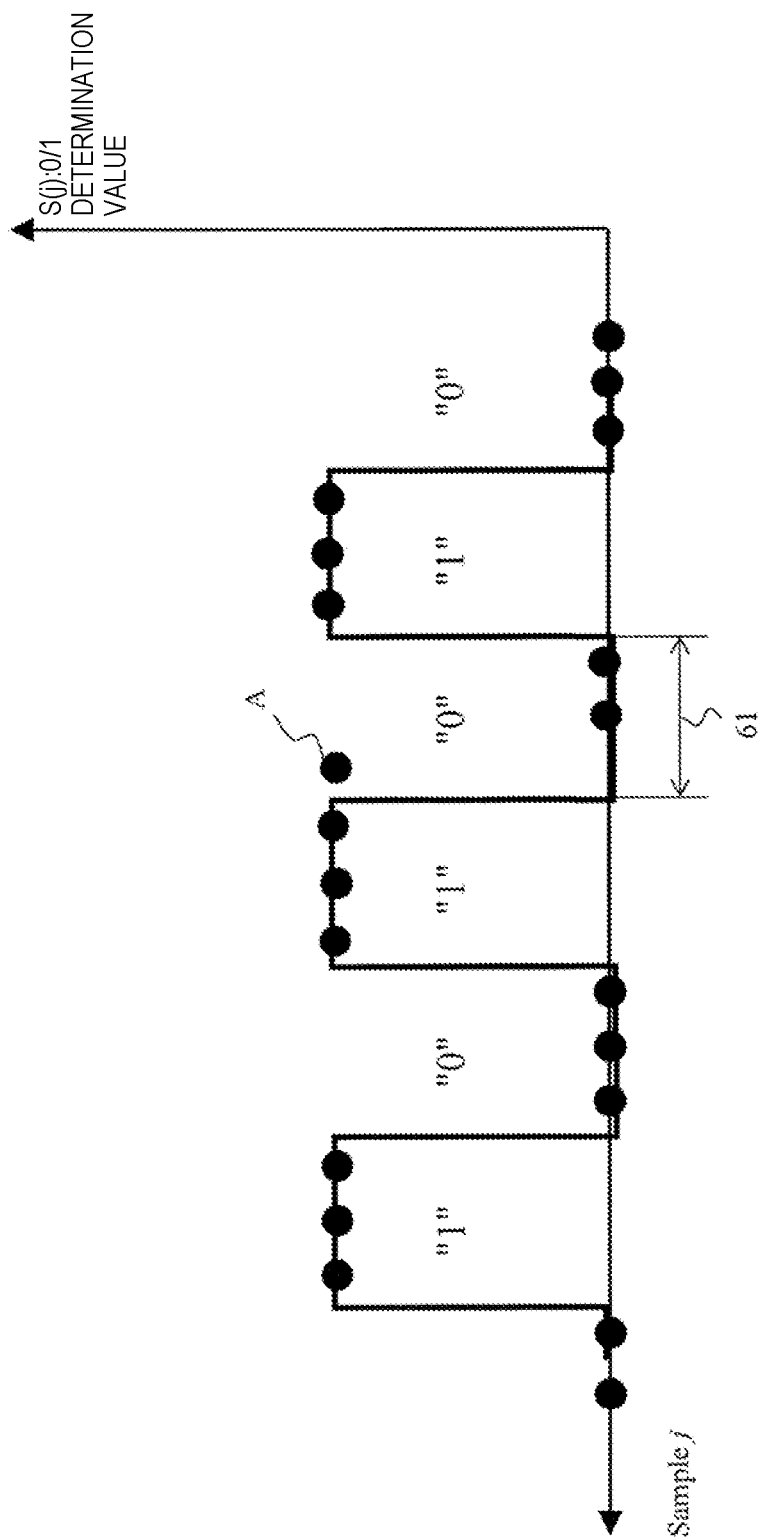
FIG. 8 is a diagram for explaining a process performed by the threshold determination unit of the terminal device according to the present invention.

The optical ID estimation unit 34 estimates each bit value of the reception signal according to a majority determination method using a determination processing window. FIG. 8 is a bit pattern of an optical signal estimated by the optical ID estimation unit 34. Because the optical ID estimation unit 34 estimates the bit value according to a majority determination method, the bit value of the bit 61 can be acquired correctly, without being influenced by the point A. The majority determination method used by the optical ID estimation unit 34 will be described later.

The information acquisition unit 32 generates signal information $S^{[k]}$ in which a number of bits in the optical signal estimated by the optical ID estimation unit 34 equal to the number of bits included in the optical ID are arranged in time-series (sampling) order. In the case of FIG. 6, the optical ID contains 8 bits, and therefore the information acquisition unit 32 generates signal information $S^{[k]}$ containing eight estimated bits ($p^{[k]}$, $p^{[k-1]}$, $p^{[k-2]}$, $p^{[k-3]}$, $p^{[k-4]}$, $p^{[k-5]}$, $p^{[k-6]}$, $p^{[k-7]}$). Also, $S^{[k]}$' is a specific example of the signal information.

[Majority Determination Method]

Figure 9:
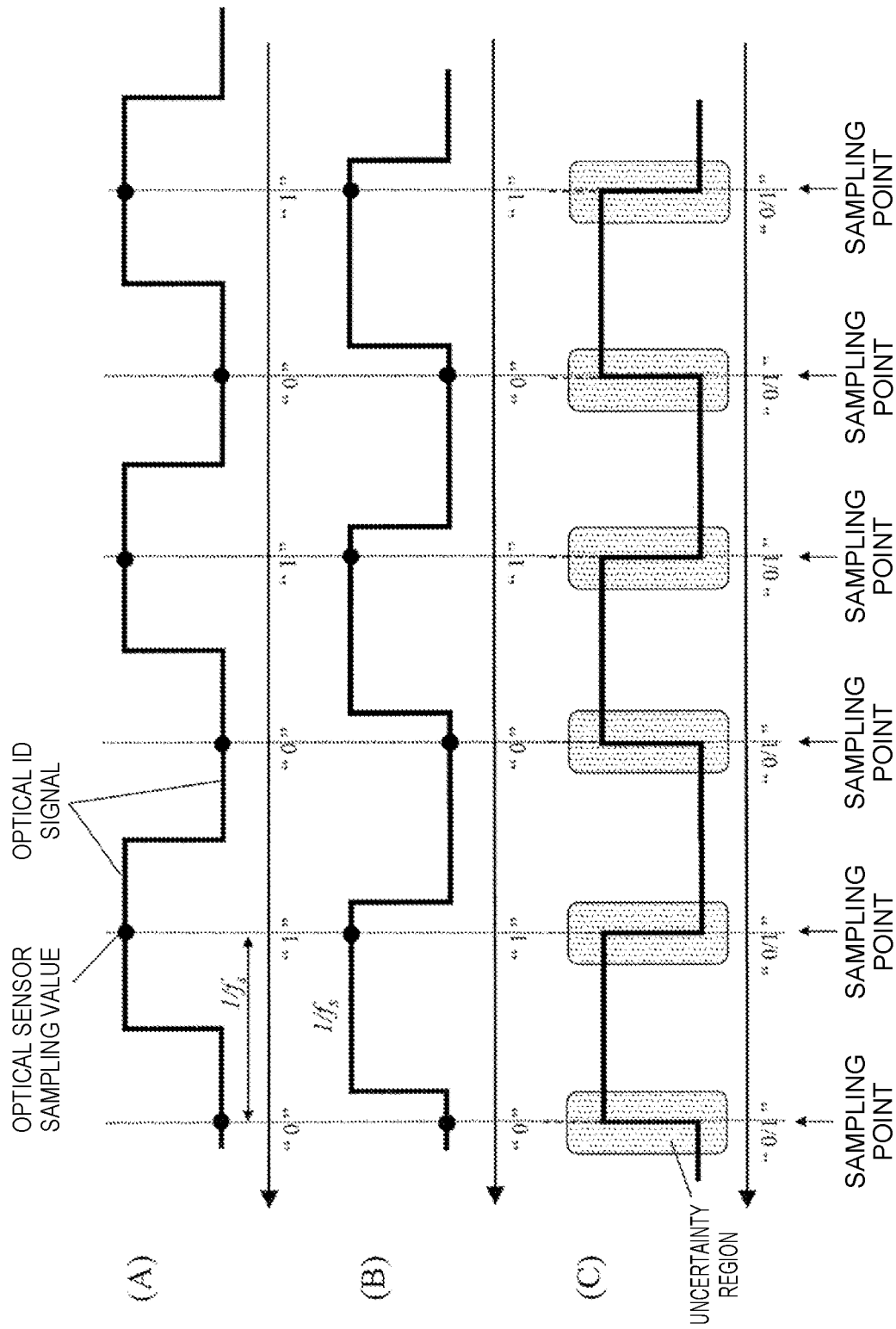
FIG. 9 is a diagram for explaining a case where a majority determination method is not adopted.

FIG. 9 is a diagram for explaining a case where a majority determination method is not adopted. As an example, consider the case where the 1/0 transmission pattern and the sampling period ($1/f_s$) have a 1:1 correspondence (sampling is performed once with respect to a single bit). FIG. 9(A) and FIG. 9(B) illustrate cases where the sampling points are inside the individual bits, while FIG. 9(C) illustrates a case where the sampling points are between the bits.

In cases like FIG. 9(A) and FIG. 9(B), each bit value can be expressed by the sampled value. However, in cases like FIG. 9(C), because sampling is performed between the bits, error occurs easily in the 1/0 determination. The time region where error occurs easily in the 1/0 determination when sampling is designated the "uncertainty region".

In this way, in optical wireless communication in which the transmitting side and the receiving side are not synchronized, the error rate may rise due to temporal misalignment between the transmission pattern and the sampling points.

Furthermore, the sampled values may not be binarized correctly due to variations in the light intensity of the received optical signal and the influence of noise.

Figure 10:
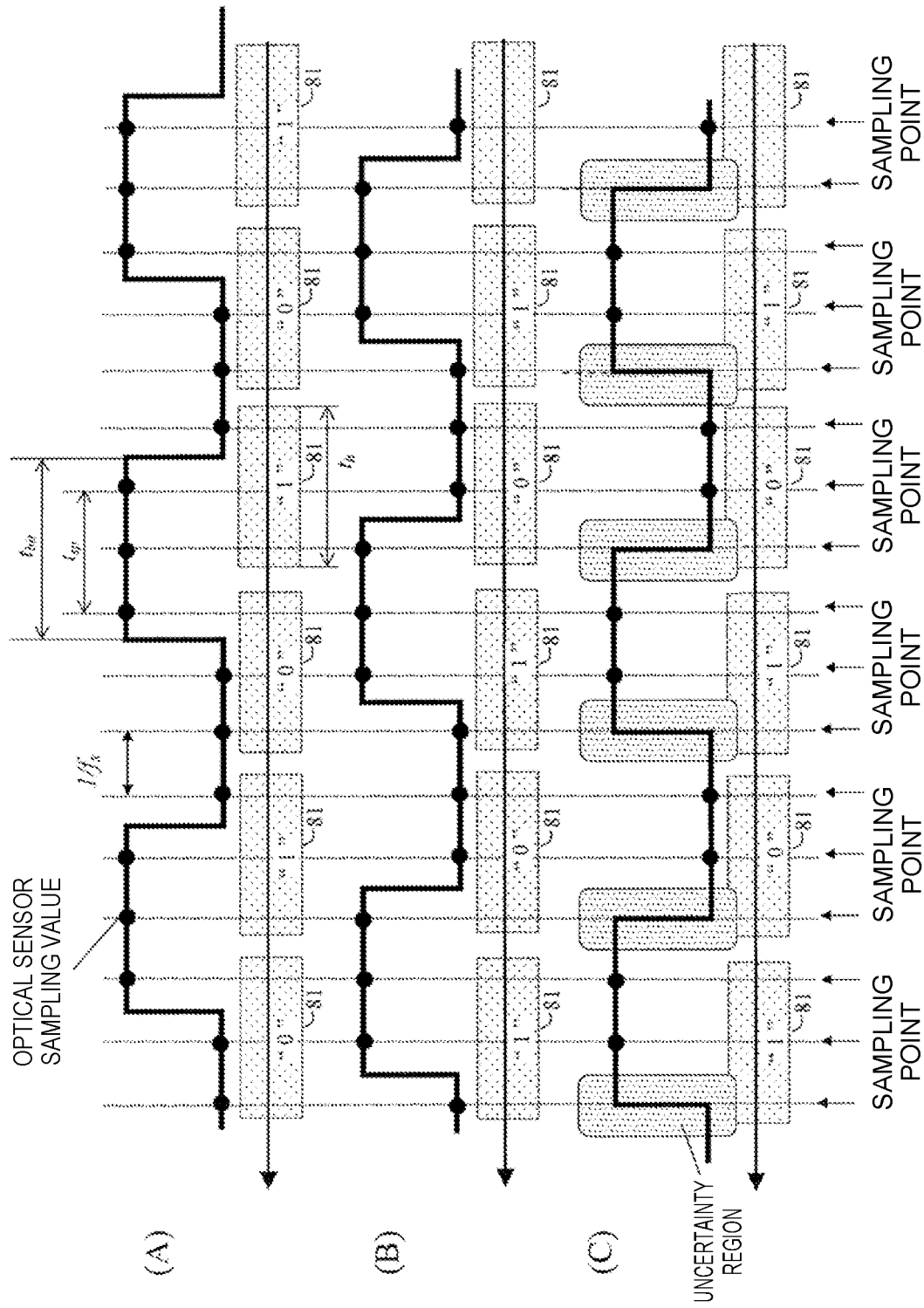
FIG. 10 is a diagram for explaining a case where a majority determination method is adopted.

FIG. 10 is a diagram for explaining the majority determination method used by the optical ID estimation unit 34. FIG. 10 illustrates a state in which the transmitting side and the receiving side are not synchronized. FIG. 10(A) and FIG. 10(B) illustrate cases where none of the sampling points is inside the uncertainty region, while FIG. 10(C) illustrates a case where one of the sampling points is inside the uncertainty region.

The optical ID estimation unit 34 has a determination processing window 81 used when making a majority determination. The duration (determination time) to of the determination processing window 81 is shorter than a duration $t_{bit}$ of a single bit in the bit pattern, and longer than a duration ($1/f_s \times n$) equal to the number n of sampling point periods included in a single bit in the bit pattern. In the example of FIG. 10, three sampling points are included inside the duration $t_{bit}$ of a single bit, and therefore the number n of sampling point periods is 2. Consequently, the determination time is as follows.

$$1/f_s \times 2 < t_h < t_{bit}$$

The majority determination method is performed as follows. The optical ID estimation unit 34 makes a majority determination regarding which determination value (0/1) of the binarized data appears more often inside the determination processing window 81. In other words, in the case where the determination value "1" is observed two or three times inside a determination processing window 81, "1" is assigned to the determination processing window 81 (bit), whereas in the case where the determination value "1" is observed 0 times or 1 time inside a determination processing window 81, "0" is assigned to the determination processing window 81 (bit).

When such a majority determination is performed, an incorrect bit determination can be avoided in the case where none of the sampling points is inside the uncertainty region as in FIG. 8(A) and FIG. 8(B) obviously, but also in the case where one of the sampling points is inside the uncertainty region as in FIG. 8(C).

Such a majority determination can also be used to avoid an incorrect bit determination even if an incorrectly determined sample "A" exists like in FIG. 8.

[End of Description of Majority Determination Method]

Figure 11:
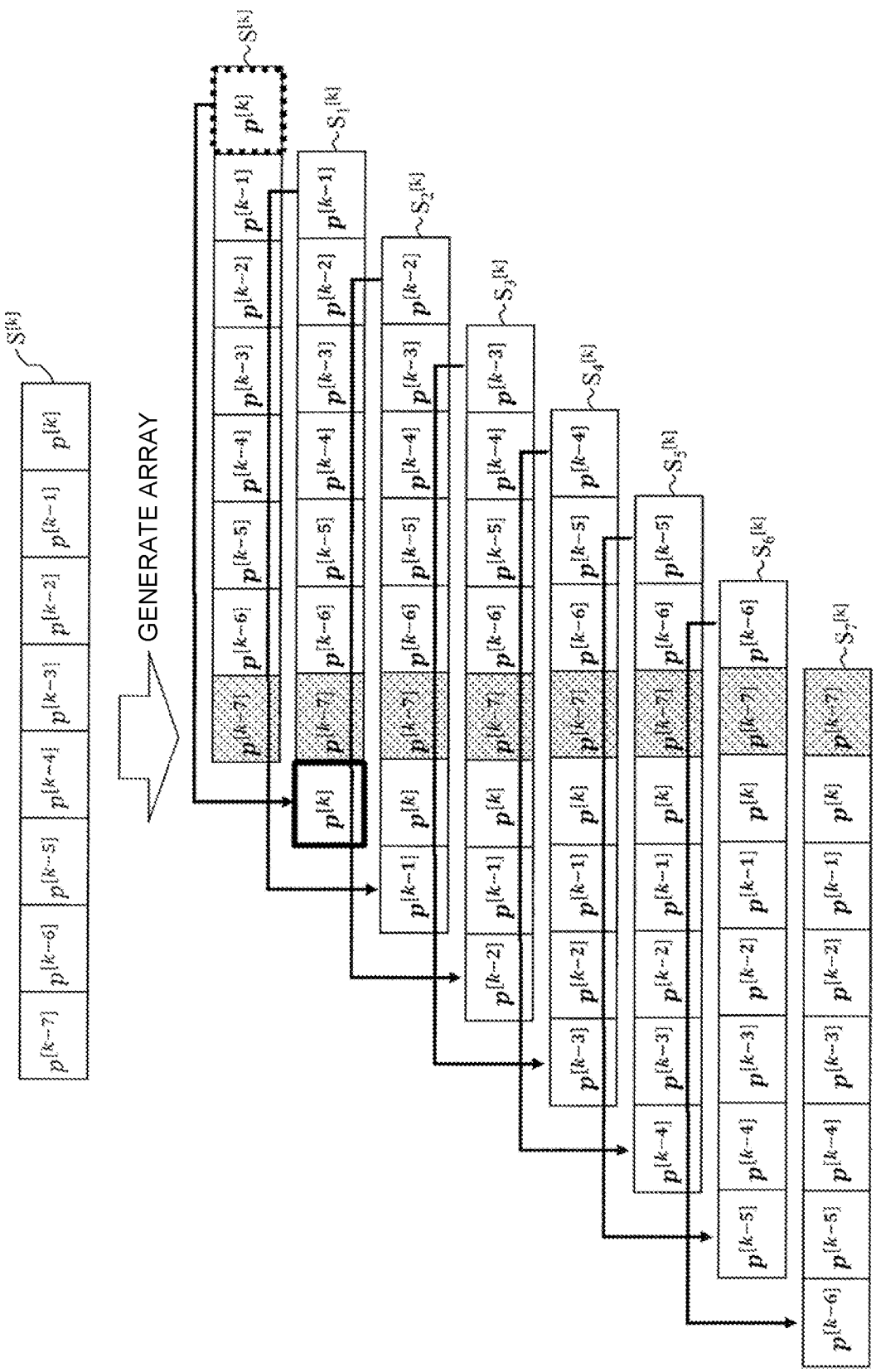
FIG. 11 is a diagram for explaining operations by an array generation unit of the terminal device according to the present invention.

FIG. 11 is a diagram for explaining operations by the array generation unit 39. In the case where the signal information ($S^{[k]}$ contains n bits, the array generation unit 39 generates an array of n pieces of signal information ($S^{[k]}$ to $S_{n-1}^{[k]}$) by sequentially shifting each bit of the signal information $S^{[k]}$ one bit at a time. FIG. 11 illustrates an example in which n=8.

The array generation unit 39 removes the 8th element (bit $p^{[k]}$) of the signal information $S^{[k]}$, and shifts each of the 1st to 7th elements (bits to $p^{[k-1]}$ to $p^{[k-7]}$) of the signal information $S^{[k]}$ one bit to the right. Additionally, the array generation unit 39 adds the removed 8th element (bit $p^{[k]}$) to the beginning to generate signal information $S_1^{[k]}$. The array generation unit 39 similarly generates signal information $S_2^{[k]}$ from the signal information $S_1^{[k]}$. The array generation unit 39 repeats the above operation seven times to generate an array of the signal information ($S^{[k]}$ to $S_7^{[k]}$).

The plurality of signal information generated in this way corresponds to signal information acquired through time-shifting. In other words, even if the transmitting side and the receiving side are not synchronized, one of the pieces of signal information is the signal information for which the transmitting side and the receiving side are synchronized. The signal information for which the transmitting side and the receiving side are synchronized is extracted in the next step.

Figure 12:
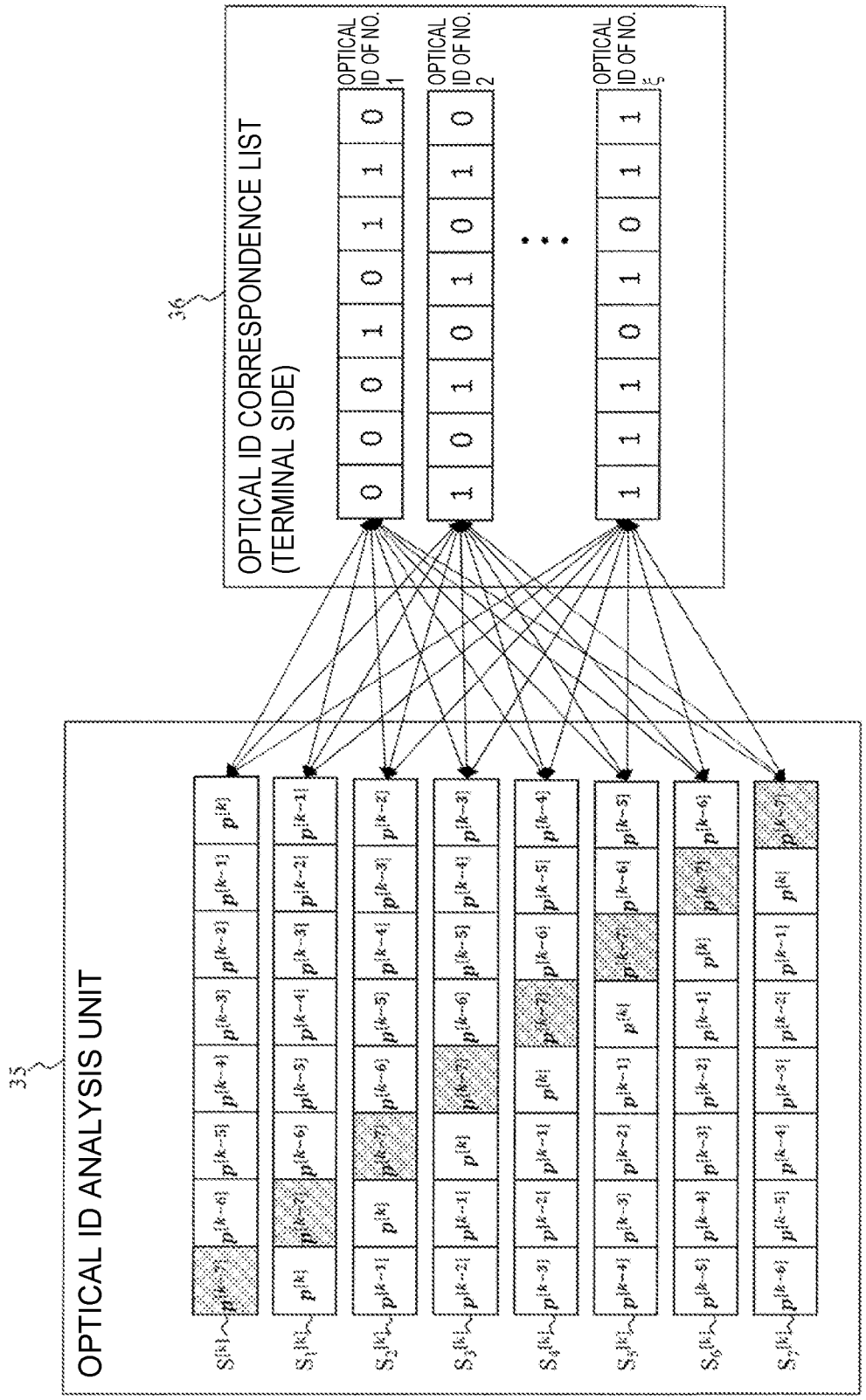
FIG. 12 is a diagram for explaining operations by an optical ID analysis unit of the terminal device according to the present invention.

FIG. 12 is a diagram for explaining operations by the optical ID analysis unit 35. In the optical ID correspondence list 36, information about the optical ID (ID information) and authentication information for initiating RF wireless communication are associated as in FIG. 14. The optical ID analysis unit 35 performs a brute-force calculation of a correlation coefficient between the n pieces of signal information generated by the array generation unit 39 and ξ pieces of ID information in the optical ID correspondence list 36, and selects the ID information with the maximum correlation coefficient. In other words, the signal information with the maximum correlation coefficient is the signal information for which the transmitting side and the receiving side are synchronized, and the ID information selected at this point is the optical ID transmitted from the base station 20.

Figure 13:
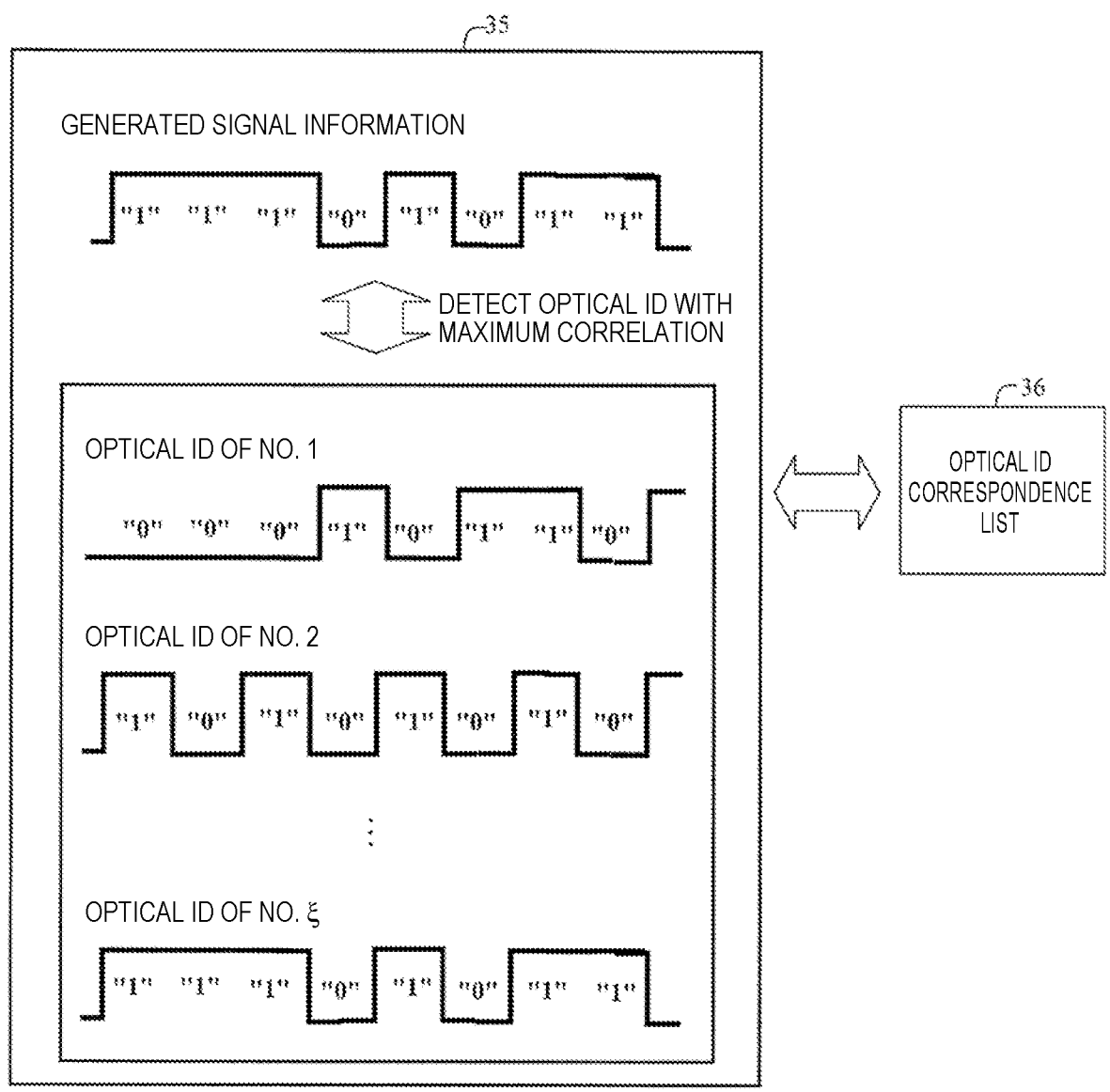
FIG. 13 is a diagram for explaining operations by the optical ID analysis unit of the terminal device according to the present invention.

FIG. 13 is also a diagram for explaining operations by the optical ID analysis unit 35 (operations for selecting the ID information with the maximum correlation coefficient). The optical ID analysis unit 35 compares the inputted signal information to the signal shapes of stored optical IDs, and extracts the optical ID having the signal shape for which the correlation is maximized. Next, the optical ID analysis unit 35 looks up the optical ID in the optical ID correspondence list 36, and selects the corresponding connection operation/authentication information (RF authentication information) from the optical ID correspondence list 36. The content stored in the optical ID correspondence list 36 is the same as the optical ID correspondence list 26 of the base station 20. FIG. 14 is a diagram for explaining an example of the optical ID correspondence list 36.

The RF transmission and reception unit 33 transmits and receives RF wireless signals according to a protocol. The protocol is Wi-Fi, LTE, or the like. For example, a plurality of wireless standards such as Wi-Fi 2.4 GHz/5 GHz may be supported. The RF transmission and reception unit 33 transmits the connection operation/authentication information (RF authentication information) selected by the optical ID analysis unit 35 to the base station 20.

Embodiment 2

Figure 15:
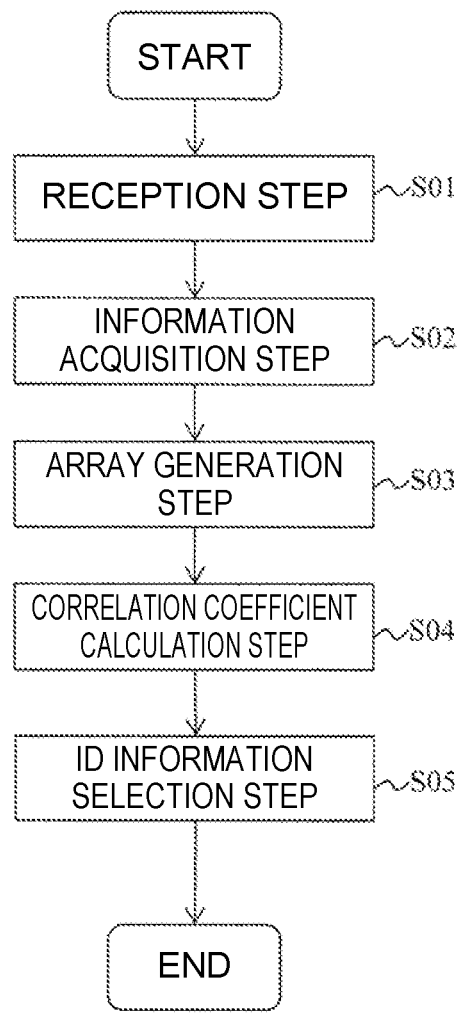
FIG. 15 is a flowchart for explaining a communication method according to the present invention.

FIG. 15 is a flowchart for explaining operations (a communication method) by the terminal device 30 described in Embodiment 1. The communication method is a communication method between the terminal device 30 and the base station 20 by optical wireless communication and RF wireless communication, the method including,
by the terminal device 30,
receiving an optical signal for the optical wireless communication from the base station 20 (step S01);
retrieving signal information containing n bits (where n is an integer equal to or greater than 2) included in the optical signal (step S02);
generating n pieces of signal information by sequentially shifting each bit of the signal information one bit at a time (step S03);
using a list in which ID information and authentication information for initiating the RF wireless communication are associated to perform a brute-force calculation of a correlation coefficient between the n pieces of signal information and the ID information in the list (step S04); and
selecting the ID information with the maximum correlation coefficient (step S05).

In step S01, the illuminance sensor 31 receives an optical signal from the base station 20 and acquires a light illuminance value.

In step S02, as described using FIG. 4 and FIG. 6, the information acquisition unit 32 acquires the signal information $S^{[k]}$ from the light illuminance value.

In step S03, as described using FIG. 11, the array generation unit 39 generates a plurality of signal information from the signal information $S^{[k]}$.

In step S04, as described using FIG. 12 and FIG. 13, the optical ID analysis unit 35 performs a brute-force calculation of the correlation coefficient between the plurality of signal information and the optical ID in the optical ID correspondence list 36 of FIG. 14, and detects the optical ID with the maximum correlation coefficient.

In step S05, the optical ID analysis unit 35 selects the RF authentication information (connection operations and authentication information for RF communication) corresponding to the optical ID with the maximum correlation coefficient from the optical ID correspondence list 36 of FIG. 14.

Figure 16:
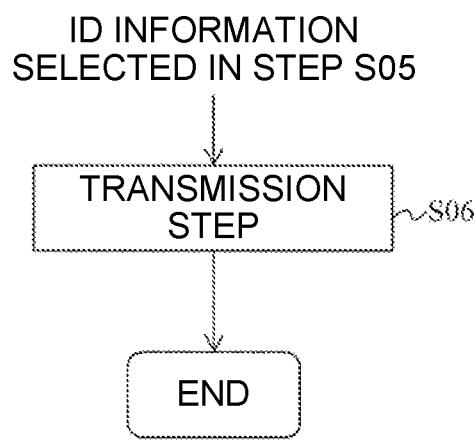
FIG. 16 is a flowchart for explaining the communication method according to the present invention.

FIG. 16 is a flowchart for explaining operations (a communication method) by the terminal device 30 described in Embodiment 1. The operations according to the present communication method may be performed after the operations described using FIG. 15. In other words, the present communication method further includes transmitting the RF authentication information to the base station 20 by RF wireless communication (step S06).

The authentication information transmitted in step S07 is received by the base station 20. Thereafter, the terminal device 30 is allowed to communicate with the upper NW 10 if the connection/authentication control unit 27 confirms that the authentication information is valid.

Embodiment 3

The information acquisition unit 32, the array generation unit 39, and the optical ID analysis unit 35 of the terminal device 30 described in Embodiment 1 may also be achieved by software (a program) installed in the terminal 30, and the program may be recorded onto a recording medium or provided over a network. In other words, the terminal 30 is capable of achieving the communication method described in Embodiment 2 with the installed software.

Figure 17:
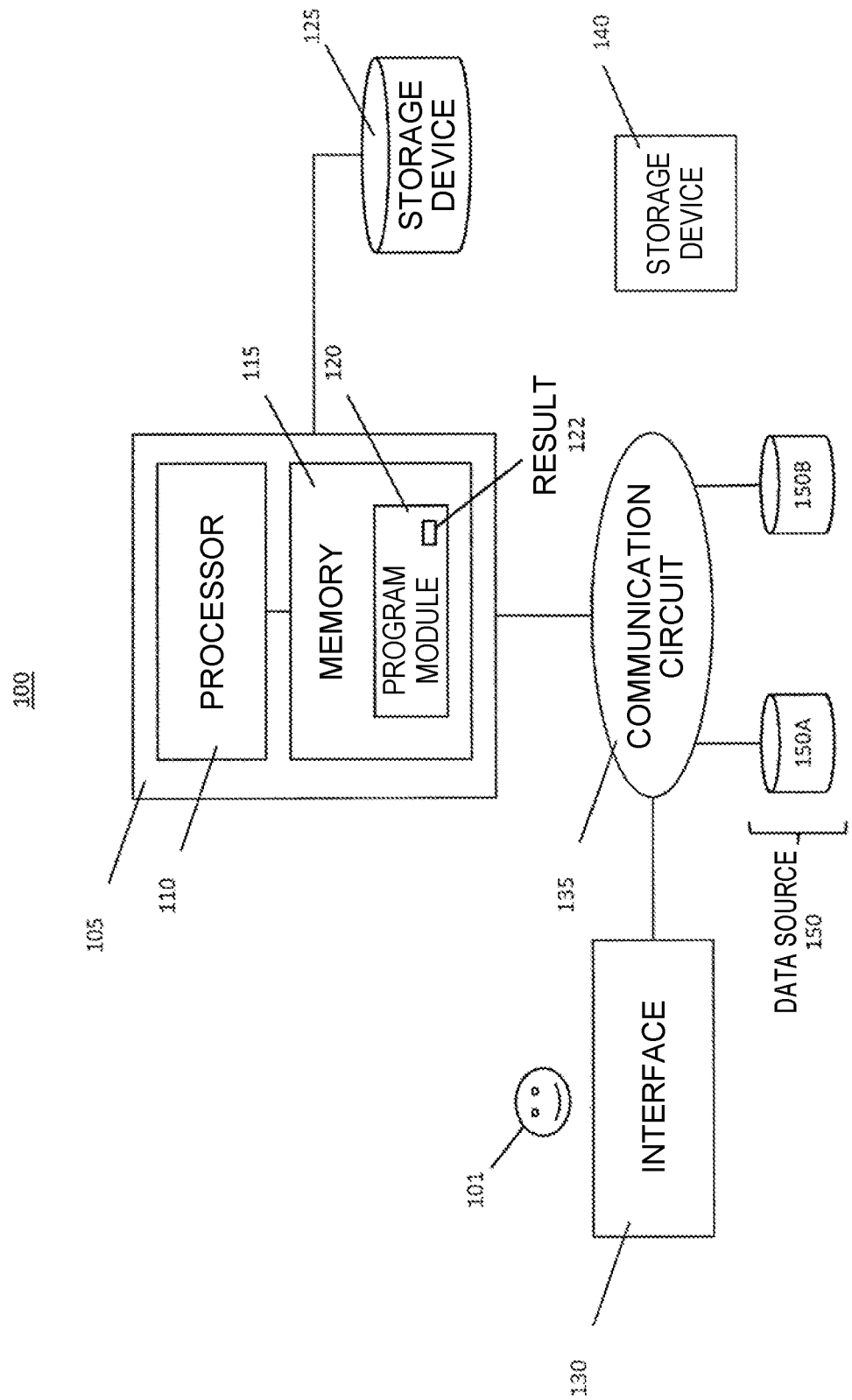
FIG. 17 is a diagram for explaining the terminal device of the communication system according to the present invention.

FIG. 17 illustrates a block diagram of a system 100. The system 100 is a terminal 30, including a computer 105 connected to a communication circuit 135. Communication between functions is achieved by electrical signals and optical signals through the communication circuit 135.

The computer 105 includes a processor 110 and a memory 115 connected to the processor 110. The computer 105 is represented as a standalone device in this specification, but is not limited to such a configuration, and may be connected to other devices not illustrated in a distributed processing system instead.

The processor 110 is an electronic device containing a processing circuit that responds to instructions and executes instructions.

The memory 115 is a tangible computer-readable storage medium in which a computer program is encoded. Regarding this point, the memory 115 stores data and instructions, or in other words program code, readable and executable by the processor 110 to control the operations by the processor 110. The memory 115 can be achieved with random access memory (RAM), a hard drive, read-only memory (ROM), or a combination of the above. One structural element of the memory 115 is a program module 120.

The program module 120 includes instructions for controlling the processor 110 to execute the processes described in this specification. In this specification, the operations are described as being executed by the computer 105, a method, a process, or a sub-process, but these operations are actually executed by the processor 110.

In this specification, the term "module" is used to refer to functional operations that may be realized as any of a standalone structural element or an integrated configuration of a plurality of subordinate structural elements. Consequently, the program module 120 may be achieved as a single module, or as a plurality of modules that operate in coordination with each other. Furthermore, in this specification, the program module 120 is described as being installed in the memory 115 and therefore achieved in software, but the program module 120 is achievable in any of hardware (for example, an electronic circuit), firmware, software, or a combination of the above.

The program module 120 is illustrated as being already loaded into the memory 115, but may also be configured such that the program module 120 is located in a storage device 140 and loaded into the memory 115 later. The storage device 140 is a tangible computer-readable storage medium that stores the program module 120. Examples of the storage device 140 include a Compact Disc, magnetic tape, read-only memory, an optical storage medium, a hard drive, a memory unit containing a plurality of hard drives in parallel, or a Universal Serial Bus (USB) flash drive. Alternatively, the storage device 140 may be random access memory or some other type of electronic memory that is located in a distant storage system not illustrated and connected to the computer 105 through the communication circuit 135.

The system 100 additionally includes a data source 150A and a data source 150B, which are collectively referred to as the data source 150 and which are communicably connected to the communication circuit 135. In actuality, the data source 150 may include any number of data sources, that is, one or more data sources. The data source 150 includes unstructured data, and may include social media.

The system 100 additionally includes an interface 130 which is operated by a user 101 and which is connected to the computer 105 through the communication circuit 135. Examples of the interface 130 include an input device such as a keyboard or a voice recognition subsystem enabling the user 101 to select and communicate information and commands to the processor 110. The interface 130 additionally includes an output device such as a display device, a printer, or a speech synthesis device. A cursor control unit such as a mouse, a trackball, or a touch-sensitive screen enables the user 101 to operate a cursor on a display device for selecting and communicating further information and commands to the processor 110.

The processor 110 outputs a result 122 of the execution of the program module 120 to the interface 130. Alternatively, the processor 110 can provide the output to a storage device 125 such as a database or a memory for example, or provide the output to a distant device not illustrated through the communication circuit 135.

For example, a program that performs the flowcharts in FIG. 15 and FIG. 16 may be treated as the program module 120. The system 100 can be made to operate as the terminal 30.

The terms "include" and "provided with" should be interpreted as indicating that the described feature, product, step, or structural element exists, but not excluding the existence of one or more other features, products, steps, structural elements, or groups of the above. The terms "a" and "an" are indefinite articles, and consequently do not exclude embodiments that include a plurality of the referent.

Other Embodiments

Note that the present invention is not limited to the foregoing embodiments, and various modifications are possible within a scope that does not depart from the gist of the present invention. In short, the present invention is not solely limited to the foregoing embodiments, and may be realized by modifying structural elements in the implementation stage within a scope that does not depart from the gist of the present invention.

In addition, various inventions can be formed by appropriately combining a plurality of the structural elements disclosed in the foregoing embodiments. For example, some structural elements may be removed from the structural elements illustrated in the embodiments. Furthermore, structural elements from different embodiments may also be combined appropriately.

[Supplement]

The present invention is an improved mechanism related to the estimation of each bit value (0/1) of a reception signal in a process of analyzing a reception signal acquired by an illuminance sensor.

When an optical ID is transmitted from a base station to a terminal device by optical wireless communication, the leading bit of the information (referred to as the "signal information" in this specification) received by the terminal device is unclear because the base station and the terminal device are not synchronized, and if the received information is checked directly against optical IDs in a list, a mismatch will occur in many cases. Accordingly, the present invention utilizes the repeated transmission of the optical ID from the base station to generate a plurality of signal information (n−1 pieces of information in the case of an n-bit optical ID) by shifting each bit of the received signal information one bit at a time. Because the plurality of signal information corresponds to receiving the information with sifted times, signal information for which the base station and the terminal device are synchronized is included among the plurality. To find this signal information, the terminal device performs a brute-force calculation of correlation coefficients between the n pieces of signal information and all optical IDs in the list, treats the signal information with the maximum correlation coefficient as the signal information in the synchronized state, and treats this signal information as the optical ID transmitted from the base station.

Advantageous Effects of Invention

According to the present invention, asynchronous reception with a low error rate can be performed without using a synchronization code (preamble), and repeated reception and verification of the optical ID can be avoided to save time associated with user authentication and the like.

REFERENCE SIGNS LIST 10 upper network
20 base station 21 optical transmission unit
22 RF transmission and reception unit
24 beam control unit
25 optical signal control unit
26 base station side optical ID correspondence list
27 connection operation/authentication control unit
30 terminal
31 illuminance sensor
32 information acquisition unit
33 RF transmission and reception unit
34 optical ID estimation unit
35 optical ID analysis unit
36 terminal side optical ID correspondence list
37 threshold determination unit
39 array generation unit
40 area
61 single bit
81 determination processing window
100 system
101 user
105 computer
110 processor
115 memory
120 program module
122 result
125 storage device
130 interface
135 communication circuit
140 storage device
150 data source

The invention claimed is:

1. A terminal device that communicates with a base station by optical wireless communication and radio frequency (RF) wireless communication, the terminal device comprising:
an illuminance sensor that receives an optical signal for the optical wireless communication from the base station;
an information acquisition unit that retrieves signal information containing n bits (where n is an integer equal to or greater than 2) included in the optical signal;
an array generation unit that generates n pieces of signal information by sequentially shifting each bit of the signal information one bit at a time;
a list in which ID information and authentication information for initiating the RF wireless communication are associated; and
an analysis unit that performs a brute-force calculation of a correlation coefficient between the n pieces of signal information generated by the array generation unit and the ID information in the list, and selects the ID information with the maximum correlation coefficient.

2. The terminal device according to claim 1, further comprising an RF transmission and reception unit that acquires the authentication information corresponding to the ID information selected by the analysis unit, and transmits the authentication information to the base station by the RF wireless communication.

3. The terminal device according to claim 1, wherein the information acquisition unit samples illuminance of the optical signal with sampling points of the same or finer granularity than a bit pattern of the optical signal, and treats the sampled values as the signal information.

4. The terminal device according to claim 1, wherein the information acquisition unit includes
a determination unit that acquires sampled values by sampling illuminance of the optical signal with sampling points of finer granularity than a bit pattern of the optical signal, and compares the sampled values to an arbitrary threshold to convert the optical signal into binary values, and
an estimation unit that has a determination time shorter than a duration of a single bit in the bit pattern and longer than a duration corresponding to sampling point intervals included in a single bit of the bit pattern, and estimates the signal information by treating a value appearing more often in the binary values included in the determination time as the value of the bit.

5. A communication method between a terminal device and a base station by optical wireless communication and radio frequency (RF) wireless communication, the method comprising:
by the terminal device,
receiving an optical signal for the optical wireless communication from the base station;
retrieving signal information containing n bits (where n is an integer equal to or greater than 2) included in the optical signal;
generating n pieces of signal information by sequentially shifting each bit of the signal information one bit at a time;
using a list in which ID information and authentication information for initiating the RF wireless communication are associated to perform a brute-force calculation of a correlation coefficient between the n pieces of signal information and the ID information in the list; and
selecting the ID information with the maximum correlation coefficient.

6. A communication system in which a terminal device communicates with a base station by optical wireless communication and radio frequency (RF) wireless communication, wherein
the terminal device comprises
an illuminance sensor that receives an optical signal for the optical wireless communication from the base station;
an information acquisition unit that retrieves signal information containing n bits (where n is an integer equal to or greater than 2) included in the optical signal;
an array generation unit that generates n pieces of signal information by sequentially shifting each bit of the signal information one bit at a time;
a list in which ID information and authentication information for initiating the RF wireless communication are associated; and
an analysis unit that performs a brute-force calculation of a correlation coefficient between the n pieces of signal information generated by the array generation unit and the ID information in the list, and selects the ID information with the maximum correlation coefficient.

* * * * *